(12) United States Patent
Fitzgerald (10) Patent No.: US 9,859,693 B2
(45) Date of Patent: Jan. 2, 2018

(54) CONVEYANCE MEMBER REMOVAL METHOD AND DEVICE

(71) Applicant: JSM CONSTRUCTION LIMITED, Potters Bar (GB)

(72) Inventor: John Fitzgerald, Potters Bar (GB)

(73) Assignee: JSM Construction Limited (GB)

( * ) Notice: Subject to any disclaimer, the term of this patent is extended or adjusted under 35 U.S.C. 154(b) by 0 days.

(21) Appl. No.: 15/309,004

(22) PCT Filed: May 7, 2015

(86) PCT No.: PCT/GB2015/051343
§ 371 (c)(1),
(2) Date: Nov. 4, 2016

(87) PCT Pub. No.: WO2015/170104
PCT Pub. Date: Nov. 12, 2015

(65) Prior Publication Data
US 2017/0085065 A1   Mar. 23, 2017

(30) Foreign Application Priority Data

May 8, 2014   (GB) .................................. 1408164.0
Dec. 19, 2014 (GB) .................................. 1422808.4

(51) Int. Cl.
*F16L 1/028*   (2006.01)
*E21B 7/18*    (2006.01)
(Continued)

(52) U.S. Cl.
CPC ................. *H02G 1/00* (2013.01); *E21B 7/18* (2013.01); *E21B 7/28* (2013.01); *F16L 1/028* (2013.01); *H02G 1/06* (2013.01)

(58) Field of Classification Search
CPC . F16L 1/028; F16L 1/032; F16L 1/036; F16L 55/18; E21B 7/18; E21B 7/28; H02G 1/06
See application file for complete search history.

(56) References Cited

U.S. PATENT DOCUMENTS 2,827,264 A * 3/1958 Sitton .................... E21B 10/40
                                                        166/381
4,403,667 A     9/1983 Reichmann et al.
(Continued)

FOREIGN PATENT DOCUMENTS

DE    19504484 C1   9/1996
DE    19802691 C1   2/2000
(Continued)

OTHER PUBLICATIONS

International Search Report and Written Opinion, PCT/GB2015/054094, dated Apr. 5, 2016.
(Continued)

*Primary Examiner* — Frederick L Lagman
(74) *Attorney, Agent, or Firm* — Craig A. Fieschko, Esq.; DeWitt Ross & Stevens S.C.

(57) ABSTRACT

Described is a device (410) for use in removing a conveyance member from a material. The device (410) includes a displacement element (412) for being placed at least partly around a conveyance member and for displacing material as the device is advanced along a conveyance member. The device (410) also includes a driven component for receiving a driving force for driving the device through material. The device can include a coupling element (418) for coupling the device to a shaft and a material loosener (414) including a drilling element. The material loosener can be operable to loosen material ahead of the displacement element as the device is advanced along a conveyance member. The drilling element can be coupled to a first wheel (436) and the
(Continued)

coupling element can include a second wheel (434) cooperating with the first wheel to transfer rotational movement of a shaft to the drilling element.

20 Claims, 9 Drawing Sheets (51) Int. Cl.
*E21B 7/28* (2006.01)
*H02G 1/00* (2006.01)
*H02G 1/06* (2006.01)

(56) References Cited

U.S. PATENT DOCUMENTS

| | | | |
|---|---|---|---|
| 5,096,000 A | 3/1992 | Hesse | |
| 5,096,002 A | 3/1992 | Cherrington | |
| 5,136,969 A * | 8/1992 | Chapman | B05B 13/0214 |
| | | | 118/305 |
| 5,351,764 A | 10/1994 | Cherrington | |
| 5,403,122 A | 4/1995 | Granella | |
| 6,244,783 B1 | 6/2001 | Puttmann et al. | |
| 7,056,065 B2 * | 6/2006 | Bayer | E21B 7/065 |
| | | | 175/53 |
| 7,963,723 B2 | 6/2011 | Wurm et al. | |
| 2004/0067108 A1 | 4/2004 | Bayer | |
| 2007/0023205 A1 | 2/2007 | Wurm | |

FOREIGN PATENT DOCUMENTS

| | | |
|---|---|---|
| EP | 0 353 442 A2 | 2/1990 |
| EP | 0 468 664 A2 | 1/1992 |
| GB | 2 103 888 A | 2/1983 |
| GB | 2 386 767 A | 9/2003 |
| GB | 2 426 534 A | 11/2006 |
| GB | 2 431 424 A | 4/2007 |
| GB | 2 466 897 A | 7/2010 |

OTHER PUBLICATIONS

International Search Report and Written Opinion, PCT/GB2015/051343, dated Sep. 23, 2015.
UK Patent Office Search Report, GB1422723.5, dated Jun. 11, 2015.
UK Patent Office Search Report, GB1408164.0, dated Oct. 29, 2014.
Energy Networks Association, Feb. 27, 2014, "Cable Extraction", Smarternetworks.org [online], Available from: http://www.smarternetworks.org/Files/Cable_Extraction_140227122330.pdf.

* cited by examiner

CONVEYANCE MEMBER REMOVAL METHOD AND DEVICE

TECHNICAL FIELD

The present invention relates to methods for removing conveyance members and devices for use in removing conveyance members.

BACKGROUND

In the United Kingdom and around the world, significant lengths of electrical cable are underground, especially in built-up areas where it is difficult or undesirable to suspend cables from pylons.

In many cases, since these cables were laid, further building has been done above the cables.

At present, in order to remove such cables, it is generally necessary to dig them out. However, this is often extremely difficult, for example where extensive building has been carried out above them and/or where the owner of the land does not wish his land to be disturbed. For example, if the cables pass under farmland, it is often necessary initially to remove and store the topsoil. Then it is necessary to dig out the cable. Once the cable has been dug out, it is necessary to import earth to fill the void left by the removed cable, before replacing the topsoil. Throughout this procedure, the farmer is unable to use his land.

As a result of these difficulties, it is often easier to leave redundant cables where they are.

However, many underground electricity cables include oil under pressure to prevent the high-voltage conductive core becoming inadvertently grounded. This can be an environmental risk since the oil can be environmentally damaging if it leaks. Furthermore, the risk of such leaks is higher with redundant cables since they are generally older and potentially degraded in comparison with newer cables.

One way in which this risk is addressed is by soldering caps onto the ends of sections of redundant cables to prevent leakage of oil. However, this is a costly process and needs to be carried out by an expert jointer.

GB 2466897, GB2431424 and GB2426534 disclose over-drilling devices. DE19802691 and DE19504484 disclose equipment for removing buried cables. Energy Networks Association NIA Project Registration and PEA Document of February 2014 provides details of a project for cable extraction.

SUMMARY OF THE INVENTION

Aspects of the present invention seek to provide an improved conveyance member removal method and device.

According to an aspect of the invention, there is provided a device for use in removing a conveyance member from a material, including:
  a coupling element for coupling the device to a shaft;
  a displacement element for being placed at least partly around a conveyance member and for displacing material as the device is advanced along a conveyance member;
  a driven component for receiving a driving force for driving the device through material; and
  a material loosener operable to loosen material ahead of the displacement element as the device is advanced along a conveyance member;
  wherein the material loosener includes a drilling element coupled to a first wheel and the coupling element includes a second wheel cooperating with the first wheel to transfer rotational movement of a shaft to the drilling element.

A difficulty faced by many prior art drilling devices is how to provide a rotational drilling movement to a drilling element. This difficulty can be exacerbated by the fact that the axis of the drilling element is generally parallel to but laterally displaced from the axis of a shaft coupling the device to a driving unit.

Preferred embodiments of the invention are able to laterally transfer rotational movement from a shaft to a drilling element using a dual wheel system, thereby effectively enabling a driving unit to remotely control and drive rotation of the drilling element.

According to an aspect of the invention, there is provided a device for use in removing a conveyance member from a material, including:
  a displacement element for being placed at least partly around a conveyance member and for displacing material as the device is advanced along a conveyance member; and
  a material loosener operable to loosen material ahead of the displacement element as the device is advanced along a conveyance member.

According to an aspect of the invention, there is provided a device for use in removing a conveyance member from a material, including:
  a displacement element for being placed at least partly around a conveyance member and for displacing material as the device is advanced along a conveyance member; and
  a driven component for receiving a driving force for driving the device through material.

Preferably the device includes a material loosener operable to loosen material ahead of the displacement element as the device is advanced along a conveyance member.

The term 'ahead' is intended to mean ahead in a direction along which the device is designed to be advanced and the terms 'forwards', 'front' and 'back' are similarly intended to be with respect to the direction in which the device is designed to be advanced.

The term 'conveyance member' is intended to refer to for example elongate and/or tubular members or lines for conveying substances or signals, such as water, gas, electricity, or fibre optic signals, in particular underground. These can be for example wires, ducts or pipes, for example metal and/or plastic pipes. Preferably, the conveyance member is a cable, preferably an electricity cable. Nevertheless, although the term 'cable' is used throughout this description, embodiments can be used with other conveyance members or conveyance lines.

Preferred embodiments of the invention are able to loosen a cable in material, such as in the ground, sufficiently that it can be pulled or pushed in a longitudinal direction to slide out and be removed from the material. The device can be said to form a void around the cable or debond the cable from the material. This can mean that it is only necessary to excavate a small section of the cable, either an end or a section in which the cable can be cut to create an end, and the cable can be slid out from under the ground. This means that it is not necessary to dig a trench as long as the section of cable it is desired to remove, thereby saving significant time and expense.

Some previous attempts to remove cables in a longitudinal manner have resulted in the cable snapping, meaning that in order to recover the entire cable, it has been necessary to dig a long trench in the conventional manner. Furthermore, a snapping cable can lead to environmental risks if there is still oil in the cable. However, by providing a device which can travel along the cable and loosen material around the cable, the risk of the friction being greater than a breaking strength of the cable is minimised. In addition, the displacement element can displace the loose material away from the cable, compacting it outside the circumference of the displacement element. This can create a void between the material and the cable, further decreasing the resistance to the removal of the cable.

Preferably, the displacement element is configured for substantially surrounding a conveyance member. Preferably, the displacement element or at least an inner edge thereof is substantially annular, and is configured to substantially surround a cable. Preferably, the displacement element is substantially circular in cross section. In other words, the displacement element can include a passageway therethrough for receiving a cable, the passageway preferably being substantially circular in cross-section.

The device can be considered to have a longitudinal axis which coincides with a longitudinal axis of a cable when the device is placed on a cable. Preferably, the material loosener is arranged substantially evenly around the longitudinal axis to provide substantially even loosening of material around a cable. The material loosener can be provided in, on, or as part of the displacement element.

In some embodiments, the material loosener is operable to create a suspension, hydrate and/or break up the material. For example, the material loosener can include a spray for spraying fluid ahead of the displacement element. This can make the material create a suspension and thereby loosen the material, allowing it to be displaced by the displacement element. The fluid can be a liquid, advantageously a lubricating liquid. The most preferred example of liquid to be used is bentonite solution. Bentonite solution is known in the drilling industry. It is a natural clay mixed with water which can cause earth and rock to float. This is advantageous since it can stabilise the void created by the displacement element, cool the device, and lubricate the displacement element. It is possible to use other fluids. For example, emulsion slurry can be used. However, this is not preferred since it is not biodegradable.

The material loosener can include a fluid distribution network including:

an inlet for receiving fluid from a fluid source; and
a plurality of forward-facing outlets for emitting fluid into material ahead of the displacement element, the plurality of outlets being coupled to the inlet by one or more conduits.

The inlet can be coupled to a fluid source via a feed conduit.

In some embodiments, the fluid distribution network includes a first distribution conduit for transporting fluid in a first angular direction around the longitudinal axis and a second fluid distribution conduit for transporting fluid in a second angular direction around the longitudinal axis opposite to the first angular direction. Each of the first and second distribution conduits can include a plurality of evenly spaced outlets. The first and second distribution conduits can be on or in the displacement element. The fluid distribution network can be housed within a housing for protection with openings for the outlets and inlet to emit and receive fluid, respectively. Part or all of the housing can be provided by the displacement element. The outlets can be configured to emit fluid through openings in the displacement element.

The material loosener can include a drilling element.

The drilling element can include any features to assist drilling, such as teeth. The drilling element is preferably operable to perform complete and continuous rotation, in other words it can preferably rotate continuously in the same angular direction through at least 360°.

In some embodiments, the drilling element is provided at or on the front of the displacement element. However, in other embodiments, the drilling element can be an annular element distinct from the displacement element. If the drilling element is a distinct annular element, it preferably has a greater diameter than the displacement element since the displacement element is designed to push out loosened material.

Preferably, the device, preferably the driven element, includes a coupling element for coupling the device to a shaft. A shaft coupled to the coupling element can apply a force to the driven element to drive the device through the material. The coupling element can include a longitudinal force transfer element to transfer a longitudinal force in the shaft into a longitudinal advancing force on the displacement element to advance the displacement element through material.

The coupling element can be configured to couple a shaft to the device to transfer longitudinal forces in the shaft to the displacement element, and rotational forces in the shaft to the material loosener. This can allow operation of the shaft to advance the device in a rotating manner, causing a drilling or boring action.

In some embodiments, the material loosener can be fixedly coupled to or integral with the displacement element so that the material loosener and the displacement element rotate together or as a single unit and the device advances as a single unit. In such embodiments, the device can include a stator with respect to which the material loosener and displacement element can rotate.

The material loosener can include a drilling element coupled to a first wheel, and the coupling element can include a second wheel cooperating with the first wheel to transfer rotational movement of a shaft to the drilling element. If the displacement element and material loosener are configured to rotate together, the first wheel can be provided in the displacement element.

A difficulty faced by many prior art drilling devices is how to provide a rotational drilling movement to a drilling element. This difficulty can be exacerbated by the fact that the axis of the drilling element is generally parallel to but laterally displaced from the axis of a shaft coupling the device to a driving unit.

Preferred embodiments of the invention are able to laterally transfer rotational movement from a shaft to a drilling element using a dual wheel system, thereby effectively enabling a driving unit to remotely control and drive rotation of the drilling element.

The coupling element may include one or more thrust bearing housings through which a shaft can rotatably pass and which can transfer longitudinal forces on the shaft into longitudinal forces on the device. The thrust bearing housings can be configured to transfer longitudinal forces to the stator, the stator being configured to transfer longitudinal forces to both of the material loosener and the displacement element.

Preferably, the second wheel is a sprocket and the first wheel includes a perforated track, preferably a chain of roller bearings. This advantageously allows loose material such as mud to be pushed out of the region of engagement of the first and second wheels by the sprockets of the second wheel pushing it through the perforations of the first wheel.

This prevents the first and second wheels from becoming clogged which would otherwise be a risk since they are designed to operate surrounded by often solid material, for example underground.

Preferably, the axes of the first and second wheels are both substantially parallel, for example are both substantially longitudinal, so that the planes of rotation of the shaft, and the first and second wheels are all substantially parallel, providing an intuitive transfer of force from a shaft to the device.

Preferably, the axis of the first wheel is outside a circumference of the second wheel.

The material loosener can include a drilling element coupled to a plurality of first wheels, and the coupling element can include a plurality of second wheels, each second wheel cooperating with a respective first wheel to transfer rotational movement of a shaft to the drilling element. If the displacement element and material loosener are configured to rotate together, the plurality of first wheels can be provided in the displacement element. Each of the first and second wheels can be as described above. Having a plurality of first and second wheels means that the components are less likely to snap and more power can be transferred to the drilling element.

In some embodiments, the material loosener can be fixedly coupled to or integral with the displacement element so that the entire device rotates and advances as a single unit. Where a drilling function is provided in these embodiments, it can be provided by oscillation of the entire device.

According to an aspect of the invention, there is provided a system for removing a cable from a material, including:
a device as described above; and
a driver for applying a forward force to the device.

Preferably, the driver includes a shaft coupled to the driven element of the device.

Preferably the driver includes a driving or drilling unit operable to apply a longitudinal force to the shaft.

Preferably the driver is operable to provide a rotating force to the device, preferably to the shaft, preferably to the material loosener.

In some embodiments, the driver is operable to supply a fluid, preferably under pressure, to the spray of the device. The fluid can be supplied for example using the shaft as a feed conduit.

According to an aspect of the invention, there is provided a device for securing a cable mover to a cable, including:
an annular clamp for being received around a cable, an internal diameter of a first end of the annular clamp being greater than an external diameter of a cable to be moved;
a coupling element for coupling the annular clamp to a cable mover; and
at least one block for being pressed between the clamp and a cable;
wherein the at least one block and/or the annular clamp includes a taper whereby a force on the clamp causes the clamp to press the block against the cable.

Preferably, the annular clamp has a taper and an internal diameter of a second end of the clamp is less than the internal diameter of the first end of the clamp.

Preferably, the block is a wedge.

Preferably, a surface, preferably a tapered surface, of the wedge includes a gripping finish, for example a roughened finish, to increase friction with the annular clamp.

According to an aspect of the invention, there is provided a method of moving a cable including:
placing an annular clamp over a cable, wherein an internal diameter of a first end of the annular clamp is greater than an external diameter of a cable to be moved;
placing at least one block between the clamp and the cable; and
applying a force to the clamp in a direction in which the first end of the clamp is facing, to move the cable;
wherein the at least one block and/or the annular clamp includes a taper whereby the force on the clamp causes the clamp to press the block against the cable.

Preferably, the force on the cable is longitudinal.

Preferably, the or each block is a wedge and the or each block is placed between the clamp and the cable with a thicker end of a taper of the wedge facing the direction in which the force is applied.

According to an aspect of the invention, there is provided a method of removing a cable from a material, the method including:
placing a device as described above on the cable at or near a first end thereof;
advancing the device towards a second end of the cable to loosen material adjacent to the cable between the first and second ends; and
applying a substantially longitudinal force to the cable to draw the cable out of the material.

According to an aspect of the invention, there is provided a method of removing a cable from a material, the method including:
loosening or displacing material adjacent to the cable; and
applying a substantially longitudinal force to the cable to draw the cable out of the material.

Advancing the device preferably includes rotating or oscillating a material loosener of the device, for example to enable any material adjacent to the cable to be loosened.

Advancing the device can include applying fluid under pressure to the spray of the device, for example to the fluid distribution network, to cause the device to spray and thereby loosen material ahead of it.

Preferably, advancing the device includes advancing a shaft coupled to a driven element of the device.

Applying fluid to the device can include applying fluid via the shaft.

The method can include excavating material around the first end to allow the device to be placed onto the cable and to allow a cable mover to be attached to the cable to apply the longitudinal force.

The method can include excavating material around the second end.

The method can include excavating material around a first and/or a second section of cable and cutting the cable in that or those section(s) to form the first and/or second end.

Preferably, if a cable is cut to form an end, the method also includes capping the cable, preferably using the method for capping a cable described below.

Preferably, after the cable is removed, the method includes pumping a filling material into a void left by the cable.

In other embodiments, the method can include inserting a duct into a void left by the cable to keep the void open for possible reuse. This can be done by attaching a duct to the second end of the cable before the cable is withdrawn so that the cable draws the duct into the void as it is being withdrawn.

According to an aspect of the invention, there is provided a method of capping a cable, including:
placing a cap over an end of a cable; and coupling the cap to the cable by a mechanical coupling only.

The cap is preferably secured to the cable by an interference fit.

The preferred method of securing a cap to a cable avoids the need to have the cap soldered to the cable. This avoids the time and expense of having an expert jointer soldering the cable.

Although the preferred method of capping a cable may allow some moisture into the cable, this is not a problem where the cable is not intended to be reused since the reason for excluding moisture is that it may provide a path to ground for electricity in a live wire. The inventors have discovered that a cap coupled by purely mechanical means is sufficient to prevent egress of oil, which is all that is necessary in redundant oil filled cables.

BRIEF DESCRIPTION OF THE DRAWINGS

Preferred embodiments of the invention are described below, by way of example only, with reference to the accompanying drawings, in which.

DESCRIPTION OF THE PREFERRED EMBODIMENTS

As described above, electrical cables are often buried in the ground. There is a variety of materials which can be around the cable underground, such as earth, soil, sand, cement, cement bound sand (CBS). Embodiments described below are generally described for a cable surrounded by soil. However, the description is equally applicable to a cable surrounded by other materials.

Particularly preferred embodiments include a drilling element and are able to address prior difficulties in how to provide a rotational drilling movement to a drilling element. However, for ease of description, these embodiments are described later.

Figures 1, 1A:
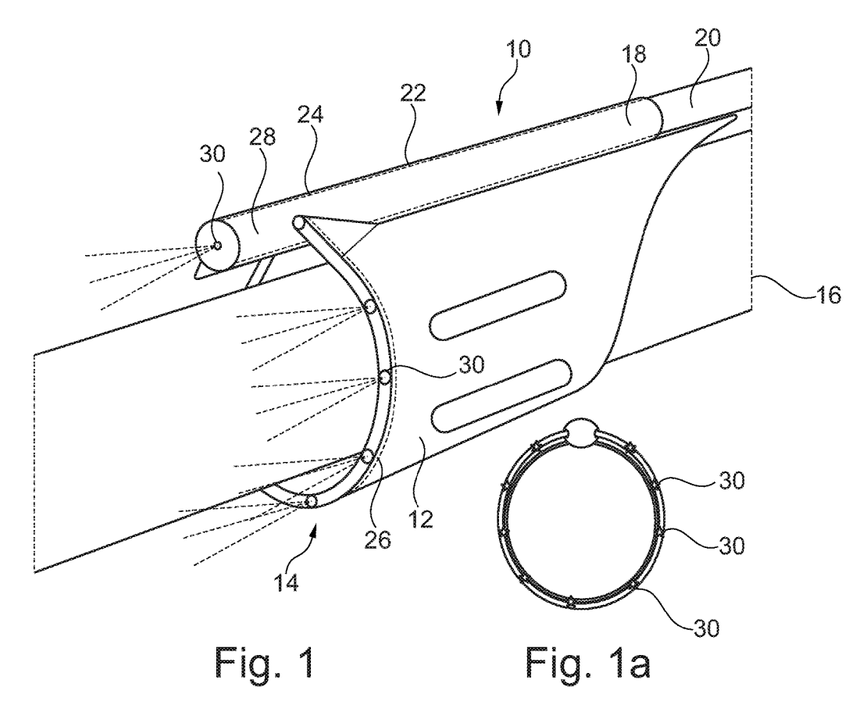
FIG. 1 is a schematic diagram of a device according to an embodiment of the invention.
FIG. 1A is a front view of the device of FIG. 1.

As can be seen from FIG. 1, a device 10 according to an embodiment of the invention includes a displacement element 12 and a material loosener 14.

The displacement element is an annular element arranged so that as it is advanced along a cable 16 it displaces soil that was adjacent to the cable 16, compacting the soil outside the outer perimeter of the displacement element 12.

The displacement element 12 and therefore the device 10 can be considered to have a longitudinal axis which when the device is placed on a cable corresponds to a longitudinal axis of the cable.

As can be seen from FIG. 1, a cross section of the displacement element 12 when viewed along the longitudinal axis is substantially circular in order to correspond with the cable 16. In particular, a cross-section of an inner passageway is substantially circular to receive the cable and a cross-section of the outer perimeter is substantially circular for tunnelling efficiency.

A diameter of the displacement element is slightly greater than the diameter of the cable 16 on which the device is designed to be used. In the embodiment of FIG. 1, the outer diameter of the displacement element is about 160 mm. However, different cables have different diameters, and it is accordingly possible to provide a plurality of devices as described herein, each with a displacement element with a diameter or at least an inner diameter of a different size, designed to fit different cables.

The device 10 includes a coupling element 18 for coupling the device to a shaft 20. The coupling element 18 can be a tube for securely receiving a shaft, for example by an interference fit. The shaft is thereby able to provide longitudinal and rotational force to the device 10. As described below, the shaft is also able to provide fluid for the material loosener 14.

The material loosener 14 in this embodiment includes a fluid distribution network providing a spray. The fluid distribution network includes an inlet 22 in the coupling element for coupling to and receiving fluid from the shaft 22, the shaft acting as a feed conduit.

The inlet 22 includes a conduit inside the coupling element 18 which leads fluid from the shaft to a fluid junction 24. The fluid junction 24 is arranged to divide fluid and includes first, second and third output conduits. The first conduit 26 passes inside and around the displacement element 12 in a clockwise direction adjacent to a front edge of the displacement element 12. The first conduit leads fluid around the displacement element 12 in a clockwise direction. Evenly spaced along the first conduit are provided apertures 30 in the conduit and displacement element 12 through which fluid in the first conduit is emitted forwards.

The second conduit corresponds to the first conduit except that it passes around the displacement element 12 in an anti-clockwise direction.

The first and second conduits terminate adjacent to each other at a point substantially diametrically opposite the junction 24. However, they are not in fluid communication at this point.

The third conduit 28 leads longitudinally forwards from the junction 24 and terminates in a further aperture 30 in line with the shaft 20.

However, in other embodiments, different configurations of the fluid distribution network are possible. For example, it is not always necessary to have the third conduit 28. Furthermore, it is possible to have a single conduit which passes all the way around the displacement element 12 from the junction 24 rather than having two conduits passing in opposing directions. It is also possible for each aperture to have its own dedicated conduit leading from the junction 24. Additionally, it is not necessary to have the apertures 30 evenly spaced. However, having two opposing conduits has been found to be an efficient way to provide a symmetrical pressure of fluid emission from a single feed conduit.

Figure 2:
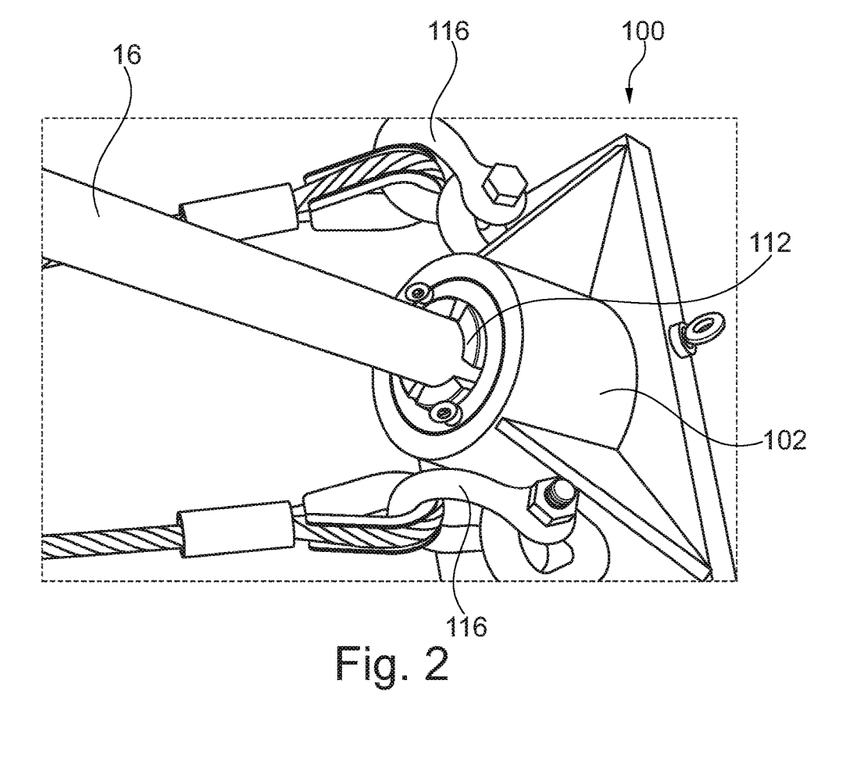
FIG. 2 is a perspective view of a device according to an embodiment of the invention.

FIG. 2 shows a device 100 for securing a cable puller to a cable 16. The device 100 includes an annular clamp 102 which can be received on a cable 16.

Figure 2A:
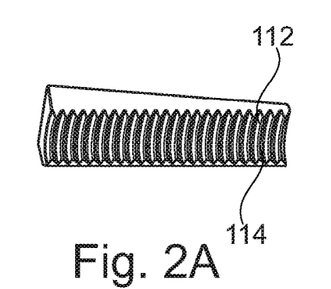
FIG. 2A is a perspective view of a wedge for use in the device of FIG. 2.
Figure 2B:
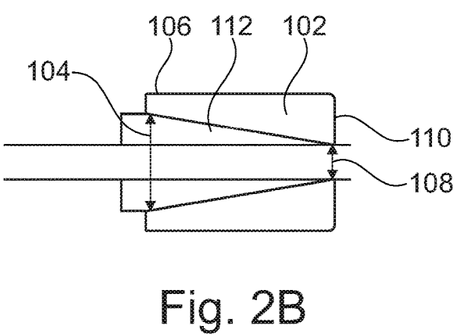
FIG. 2B is a schematic cross section of the device of FIG. 2.

As can be seen more clearly in FIG. 2B, the annular clamp includes a first internal diameter 104 at a first end 106 and a second internal diameter 108 at a second end 110. The internal diameter is the diameter of the cross section viewed along a longitudinal direction inside the clamp, in other words the space through which a cable can pass.

The first internal diameter 104 is greater than the second internal diameter 108 and the internal surface of the annular clamp tapers from the first end to the second end.

The device includes a plurality of removable wedges 112. The wedges are blocks with a tapering surface 114. The taper of the tapering surface 114 corresponds to the taper of the annular clamp so that the wedges 112 can fit between the internal surface of the annular clamp and the cable while being in substantially full contact with both.

The tapered surface 114 of the wedges 112 is provided with a roughened gripping finish to increase friction with the clamp.

As can be seen from FIG. 2, in this embodiment there are four wedges 112 for being placed between the clamp and a cable. However, there can be more or fewer than four in other embodiments.

The device 100 includes a plurality of coupling elements 116 attached to the clamp for coupling to a cable puller. As shown, these can be in the form of loops. They are preferably located symmetrically about the annular clamp in order to provide a substantially longitudinal force to the device 100. In the embodiment of FIG. 2, the coupling elements 116 are located in a line with the clamp, with one either side of the clamp.

The devices 10 and 100 described above can be used in a method of removing a cable as follows.

Figure 3A:
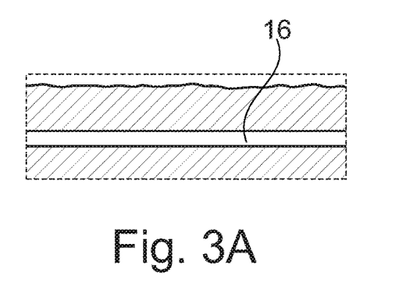
FIG. 3A is a schematic cross section of an area of ground in which a cable is located.

As shown in FIG. 3A, an area of ground is located in which a cable 16 passes under the ground.

Figure 3B:
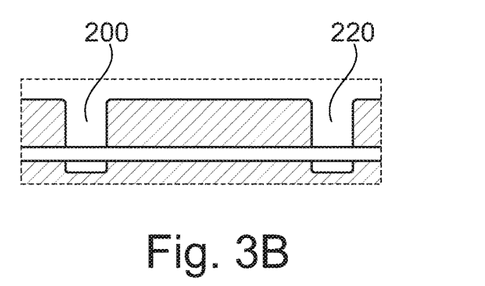
FIGS. 3B to 3H are schematic cross sections of the area or a part of the area of ground of FIG. 3A during operation of a method according to an embodiment of the invention.

As shown in FIG. 3B, a first excavation is made to excavate a launch site 200 exposing a first section of the cable 16, and a second excavation is made to excavate a receive site 220 exposing a second section of the cable 16.

Figure 3C:
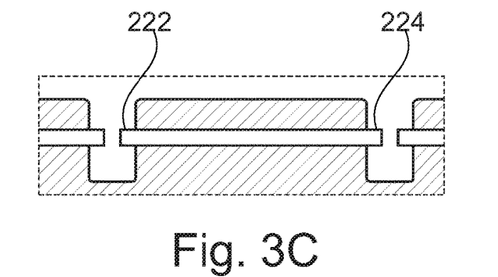

As shown in FIG. 3C, the first and second sections of cable are cut to create a section of cable to be removed with a first end 222 and a second end 224.

Figure 3D:
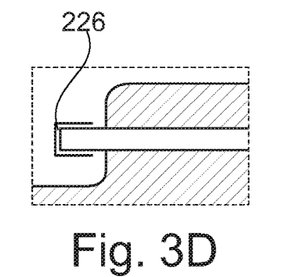
Figure 3E:
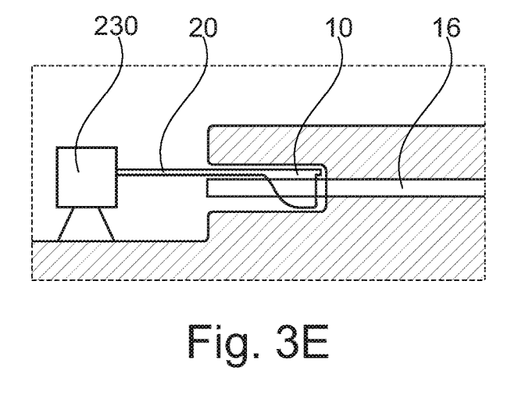
Figure 8:
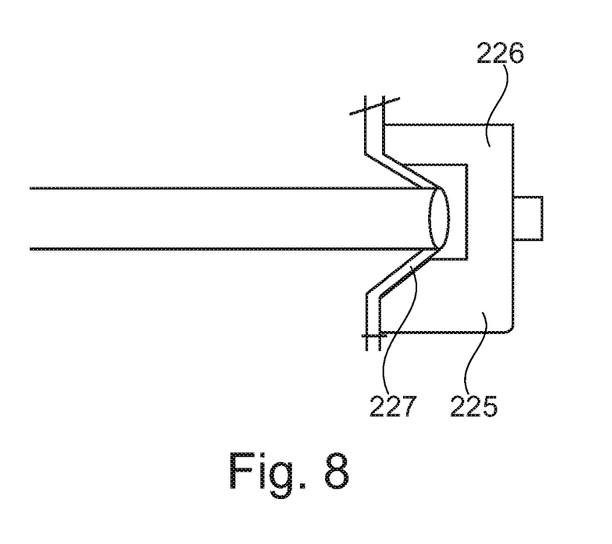
FIG. 8 shows a cross section of a cap for an end of a cable in an embodiment of the invention.

As shown in FIG. 3D, each of the exposed ends of cable have a cap secured to them by purely mechanical means. The caps 226 are generally available for sale as caps for gas or water pipes. Previously, it has been considered necessary to solder copper caps to the ends of electric cables, especially oil filled electric cables, to keep out moisture. However, this is expensive. While soldering copper caps can still be done if the cable is to be reused, for redundant cables, it is advantageous to secure a cap by purely mechanical means. A cross section of the cap 226 on the end of the cable is shown in more detail in FIG. 8. As can be seen from FIG. 8, a cap end 225 is an open-ended cylinder configured to fit over the end of the cable. The cap end 225 includes a rubber annular wedge 227 which tapers from a first larger inner diameter nearer the open end of the cap end to a second smaller inner diameter nearer the closed end of the cap end. As a cable is pushed into the wedge, an interference fit is formed between the wedge and the cable to hold the cable.

The next stage is to loosen material adjacent to the cable 16 for the section that is to be removed.

A first end of a shaft 20 is coupled to a device 10 as described above. A second end of the shaft 20 is coupled to a horizontal directional drilling unit 230. Horizontal directional drilling units 230 are well known in the drilling sector.

The device 10 is placed over the first end 222 of the cable 16 so that the cable passes through the annulus of the displacement element 12.

The drilling unit 230 is operated to supply liquid, in this example in the form of bentonite solution, through the shaft 20 under pressure.

The liquid enters the inlet 18 of the device 10 and is distributed by the junction 24 to the first, second and third conduits. Owing to the pressure of the liquid, the liquid sprays out of the apertures 30 in a forward direction with respect to the device 10.

The horizontal directional drilling unit 230 is operated to apply a longitudinal force to the shaft 20 and thereby advances the device. The drilling unit 230 can also apply a rotational force to the shaft to cause the device 10 to oscillate as it is advanced. While this can advantageously make the loosening of the material more efficient and symmetric, it is not always necessary.

As the device 10 is advanced into the soil, the liquid is being sprayed in front of the device, causing the soil to become a loose suspension. As the displacement element is advanced into this loose suspension of soil, it easily pushes it away from the cable 16 and compacts it outside the perimeter of the displacement element 12. This creates a void immediately around the cable 16.

Often, the shaft will be made up of a plurality of shaft sections. In this case, the drilling unit 230 is operable to couple the shaft sections together to lengthen the shaft as it is being advanced, in a manner known in the art.

Once the device 10 has emerged in the receive pit 220, the device 10 is decoupled from the shaft 20 and removed. However, the shaft is left in position.

Figure 3F:
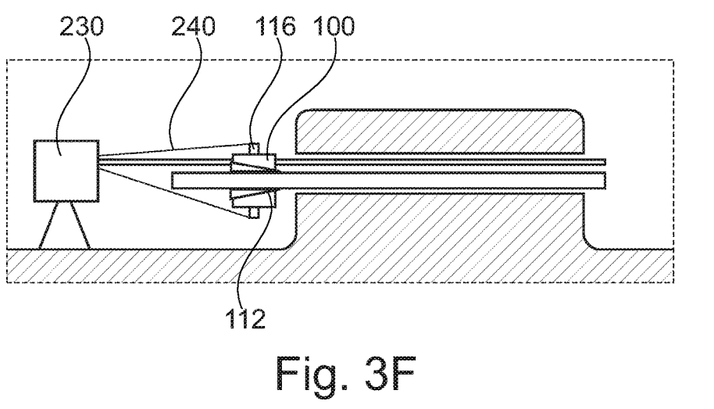

The shaft 20 is then decoupled from the drilling unit 230 and a device 100 as described above is attached to the cable 16 near the first end 222 as shown in FIG. 3F.

The device 100 is placed over the first end of the cable and advanced over the cable so that the first end 106 of the device 100 faces the direction in which the cable is to be withdrawn.

The wedges are then placed between the internal surface of the clamp 102 and the cable 16, and the coupling elements 116 are coupled to the drilling unit 230, which now serves as a cable remover, for example by cables 240.

The cable remover 230 is then operated to apply a longitudinal force to the device 100 in the direction from the second end 110 of the device 100 towards the first end 106.

The grip of the device 100 on the cable 16 causes this longitudinal force to be transferred to the cable and to draw the cable out of the soil towards the cable remover 230.

As the clamp 102 is pulled by the cable remover, the cooperation of the tapers of the wedges and the internal surface of the clamp causes the clamp to press the wedges tighter against the cable, thereby increasing the grip of the device on the cable. This minimises the ability of the clamp to slide along the cable.

Owing to the looseness of the soil where the device 10 has traveled along the cable and/or to the void created by the device, the cable 16 slides out of the soil in response to being pulled by the device 100.

In some embodiments, it is possible to attach a duct to the second end of the cable 16 so that as the cable is removed, it draws the duct in to replace the cable, thereby keeping the void open for possible future reuse.

Figure 3G:
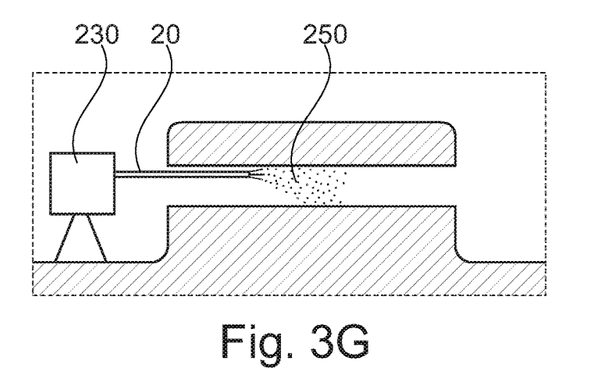

However, in the depicted embodiment, once the cable has been removed, the shaft 20 is recoupled to the drilling unit 230 and the drilling unit is operated to retract the shaft 20 while spraying a grout 250 into the void left by the cable as shown in FIG. 3G.

Figure 3H:
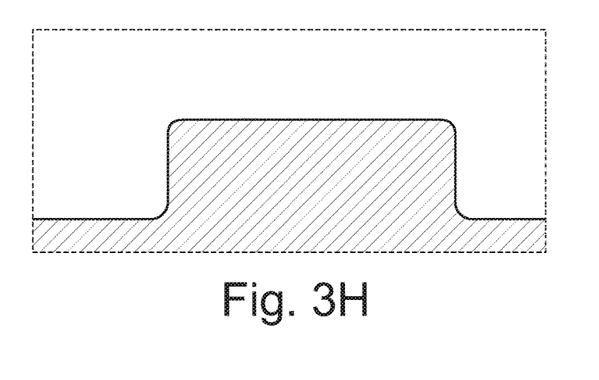

After about 6 hours, the grout will have set, thereby securely filling the void as shown in FIG. 3H.

The method described herein can provide an inexpensive and rapid way to remove underground cables, with minimal disruption to the surface. Preferred methods can remove a 150 m section of cable, which would normally take about 2 weeks to remove, in about 90 minutes.

In addition to the above, various modifications can be made and different embodiments are possible.

Although the displacement element 12 is generally described as being annular, it is not necessary in all embodiments for the displacement element 12 to be continuous around the cable. However, it is preferred that the displacement element 12 is configured to displace material from the entire periphery of the cable. It is also not necessary that the displacement element 12 is circular in cross section when viewed along the longitudinal axis. However, it is preferred that the cross section when viewed along the longitudinal axis substantially corresponds to the cross section of the cable 16 when viewed along the longitudinal axis as this tends to maximise the material displacement efficiency of the displacement element.

Figure 4:
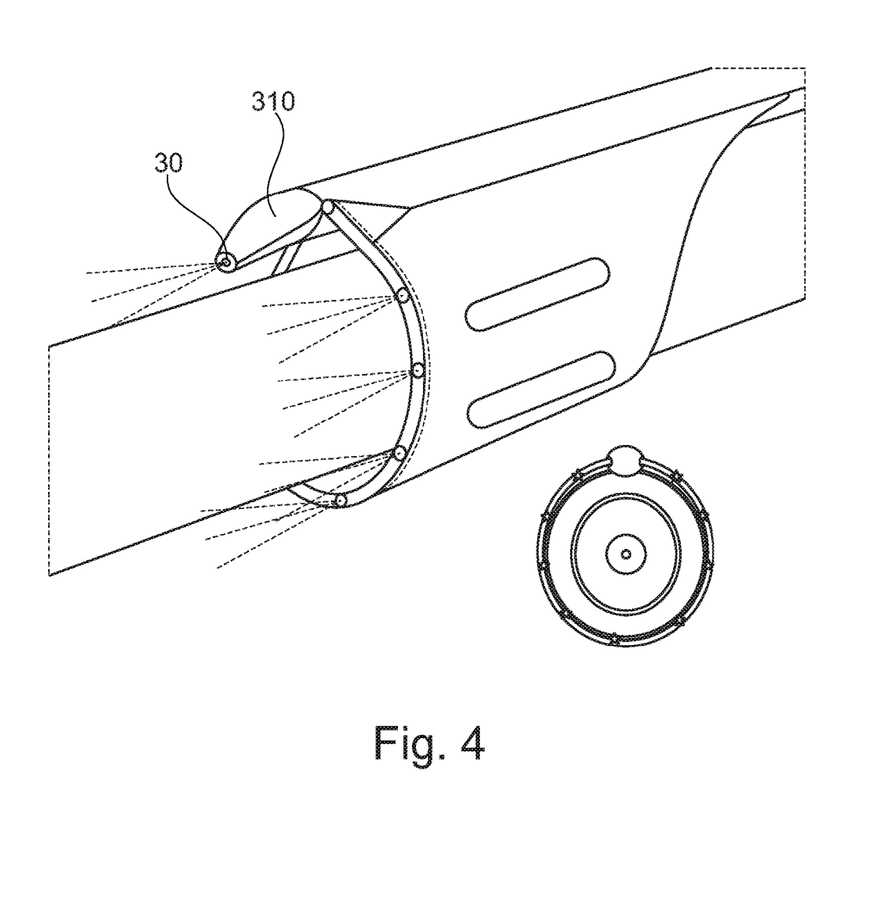
FIG. 4 is a schematic perspective view of a device according to an embodiment of the invention.

FIG. 4 shows another embodiment of a device for use in removing a cable corresponding in many respects to the device 10 of FIG. 1. However, in the device of FIG. 4, the aperture 30 at the end of the third conduit is provided in a nozzle 310.

Figure 5:
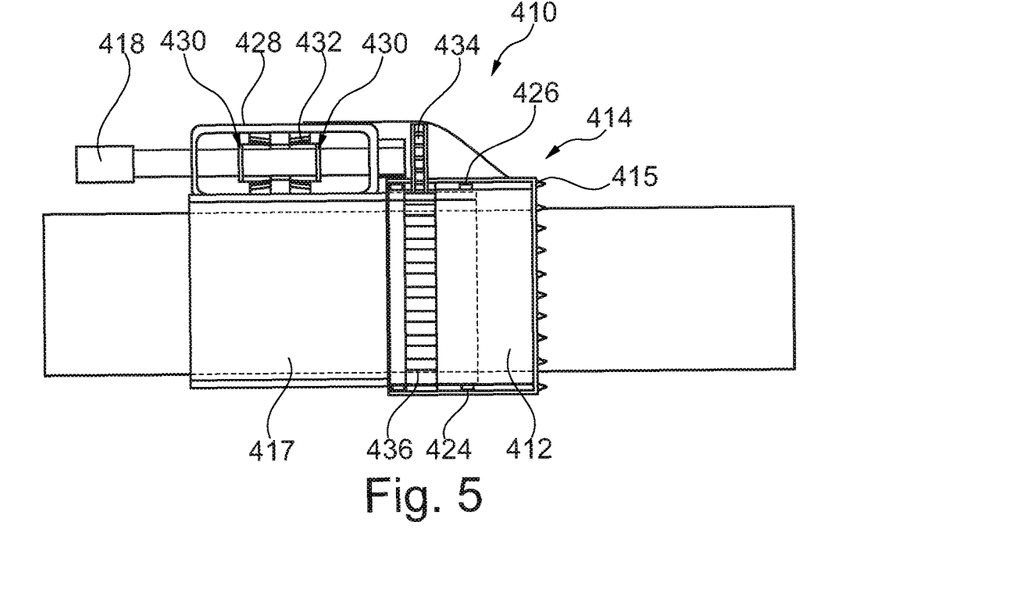
FIG. 5 is a schematic side cut-away view of a device according to an embodiment of the invention.

FIG. 5 is a schematic side view of another embodiment of a device 410 for use in removing a cable.

The device 410 includes a displacement element 412 and a material loosener 414.

As for the embodiment of FIG. 1, the displacement element 412 is an annular element arranged so that as it is advanced along a cable 16 it displaces soil that was adjacent to the cable 16, compacting the soil outside the outer perimeter of the displacement element 412.

As for the embodiment of FIG. 1, a cross section of the displacement element 412 when viewed along the longitudinal axis is substantially circular in order to correspond with the cable 16 and a diameter of the displacement element is slightly greater than a diameter of the cable 16 on which the device is designed to be used.

As for the embodiment of FIG. 1, the device 410 includes a coupling element 418 for coupling the device to a shaft 20. The shaft is thereby able to provide longitudinal and rotational force to the device 10.

The material loosener 414 in this embodiment includes a drilling element 415. The drilling element 415 in this embodiment is a plurality of teeth projecting from a front of the displacement element 412. The teeth can be integral with or fixedly coupled to the displacement element.

In this embodiment, the displacement element 412 is rotatable through 360° about the longitudinal axis. Rotation of the displacement element 412 causes a corresponding rotation of the drilling element 415.

In this embodiment, there is provided a stator 417 with respect to which the displacement element 412 and drilling element 415 rotate. The stator 417 is annular, preferably cylindrical, and is configured for a cable to pass through it.

The stator 417 has a smaller diameter than the displacement element 412 and is partly inside the displacement element. However, in other embodiments, the stator 417 can have a larger diameter than the displacement element.

The displacement element 412 is rotatably coupled to the stator 417, but in a manner which allows longitudinal force to be transferred from the stator to the displacement element 412. In the depicted embodiment, this is by providing an internal circumference of the displacement element with first and second circumferential channels 424, and providing the stator with corresponding projections 426 on its outer surface, in this embodiment in the form of brass wear rings, which allow the channels to rotate but not to move longitudinally with respect to the projections. A cross sectional view of the stator showing the projections, and a cable within the stator can be seen in FIG. 5B.

However, there are various other means known to one skilled in the art for coupling a rotator to a stator so that rotational relative movement is permitted but longitudinal relative movement is inhibited. For example the channels and projections can be the other way around, with the channels on the rotating displacement element and the projections on the stator, and there can be more or fewer than two channels.

In this embodiment, the coupling element 418 is rotatable with respect to the stator 417. The coupling element 418 passes through a thrust box 428 which is fixedly coupled to the stator 417 and which allows the coupling element 418 to rotate with respect to it, but restricts longitudinal movement, thereby transferring longitudinal forces from the coupling element to the stator 417. As can be seen from FIG. 5, in this embodiment this is achieved by providing ridges on the coupling element 418 which abut thrust bearings 432 when they try to move longitudinally. The thrust bearings are coupled to the thrust box to transfer longitudinal forces thereto.

However, there are various other means known to one skilled in the art for coupling a rotating shaft to a stator so that rotation of the rotating shaft is permitted but longitudinal relative movement is inhibited.

A sprocket 434 is coupled to the coupling element 418. The sprocket is arranged to rotate in a plane perpendicular to the longitudinal axis. The sprocket is arranged to cooperate with a perforated track 436 on or in the displacement element 412. The perforated track is circumferential on or in the displacement element and the axis of the sprocket is outside the circumference of the displacement element. The cooperation of the sprocket and track is shown more clearly in FIG. 5A.

Figure 5A:
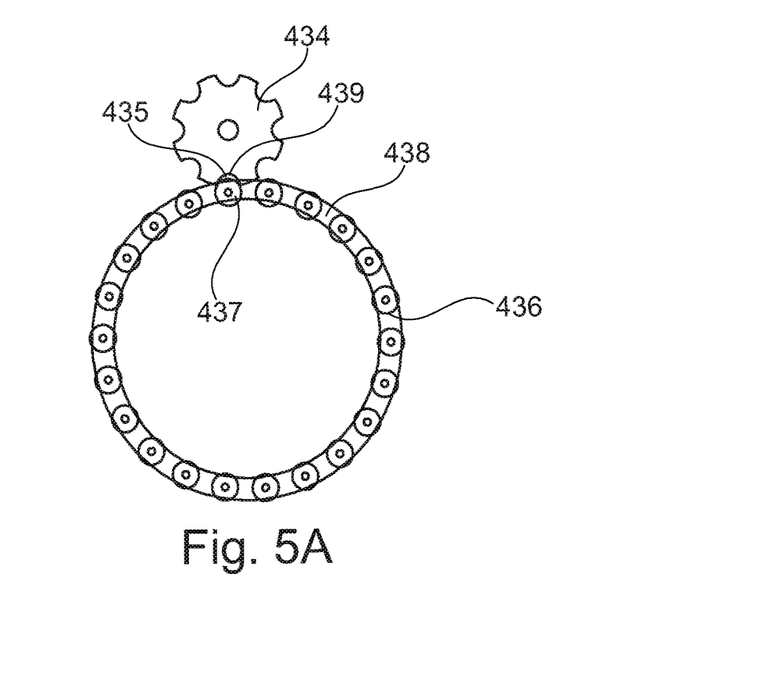
FIG. 5A is a schematic front view of a rotational force transfer element for the device of FIG. 5.
Figure 5B:
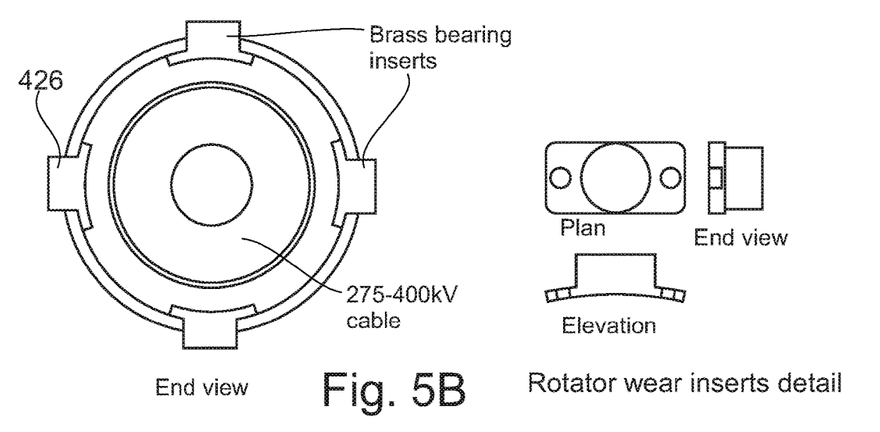
FIG. 5B is a front view of a longitudinal force transferring element.

As shown in FIG. 5A, the teeth of the sprocket are configured to press into perforations 438 in the track, thereby forcing soil or other material out to prevent the system becoming clogged as it is drilling. The perforated track in this embodiment is provided by a chain of roller bearing needles. However, other forms of chain or perforated track can be used in other embodiments. Alternatively, gears can be used, although these are not preferred since they are at risk of becoming clogged.

Where the perforated track is provided on the displacement element, the displacement element is preferably provided with holes corresponding to and aligning with the perforations in the track to allow soil or other material to be pushed through the displacement element by the teeth of the sprocket. Where the perforated track is provided in the displacement element, the perforations preferably pass all the way through the displacement element to allow soil or other material to be pushed through the displacement element.

As can be seen in FIG. 5A, the sprocket 434 is configured to leave a gap 435 between the track and the troughs 439 of the sprocket as those troughs pass over the track, the troughs being between two adjacent teeth of the sprocket. In this embodiment, the needle rollers 437 and the troughs have different radii of curvature to prevent a needle roller completely filling a trough. In this embodiment, the trough has a radius of curvature less than a radius of curvature of the needle rollers. The gap 435 enables grit or dirt to be held in the gap until it can escape without jamming the device or forcing the device to crush the dirt or grit which may be difficult where the dirt or grit is hard.

The coupling of the shaft to the drilling element enables the drilling element to be rotated through a full rotation. It also enables an efficient transfer of rotational force from the shaft to the drilling element.

The embodiment of FIG. 5 can also optionally be provided with a fluid distribution network as described in connection with FIG. 1.

The device of FIG. 5 is operated in a similar way to the device of FIG. 1 during removal of a cable. However, the device of FIG. 5 is particularly useful for hard materials such as cement bound sand where significant drilling is required.

As the drilling unit 230 described above advances the shaft 20 which is coupled into the coupling element 418, it also rotates the shaft 20 preferably continuously in the same angular direction. This causes rotation of the coupling element 418, which in turn causes rotation of the sprocket 434.

The cooperation of the sprocket 434 and track 436 means that the sprocket 434 causes rotation of the displacement element 412 with respect to the stator 417.

The rotation of the displacement element 412 with respect to the stator 417 causes rotation of the drilling element 415 with respect to the stator 417, preferably continuously in the same angular direction, causing the drilling element to provide a drilling action on material in front of it, thereby loosening the material.

Longitudinal forces applied to the shaft are transferred to all components of the device thereby advancing the device through the material and causing the displacement element to displace the material as described above.

As explained above, a difficulty in drilling devices has been in transferring rotational motion of a shaft to a drilling element the axis of which is laterally offset. The embodiment of FIG. 5 is able to transfer rotational motion of a shaft to rotational motion of the drilling element. Furthermore, it is able to do this without the mechanism for transferring the rotational movement becoming clogged with the loosened material.

Figure 6:
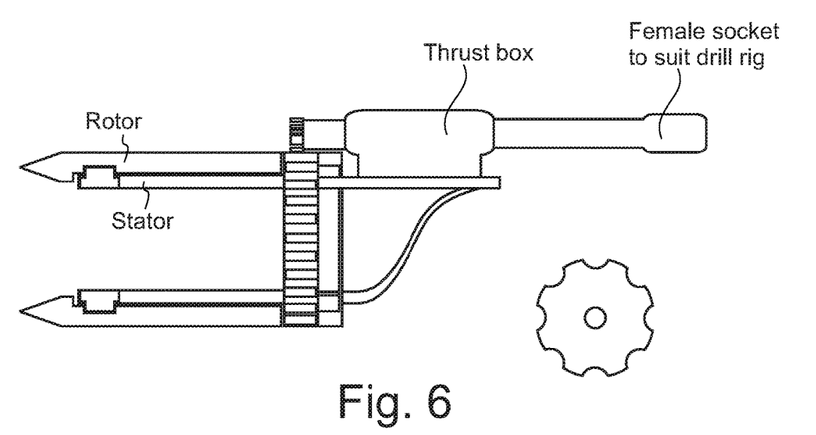
FIG. 6 is a schematic side cut-away view of a device according to an embodiment of the invention.

FIG. 6 is a schematic cut-away view of a device according to another embodiment of the invention. The device corresponds in many respects to the device of FIGS. 5 and 5A, except that the stator has a tapering back.

Figure 7:
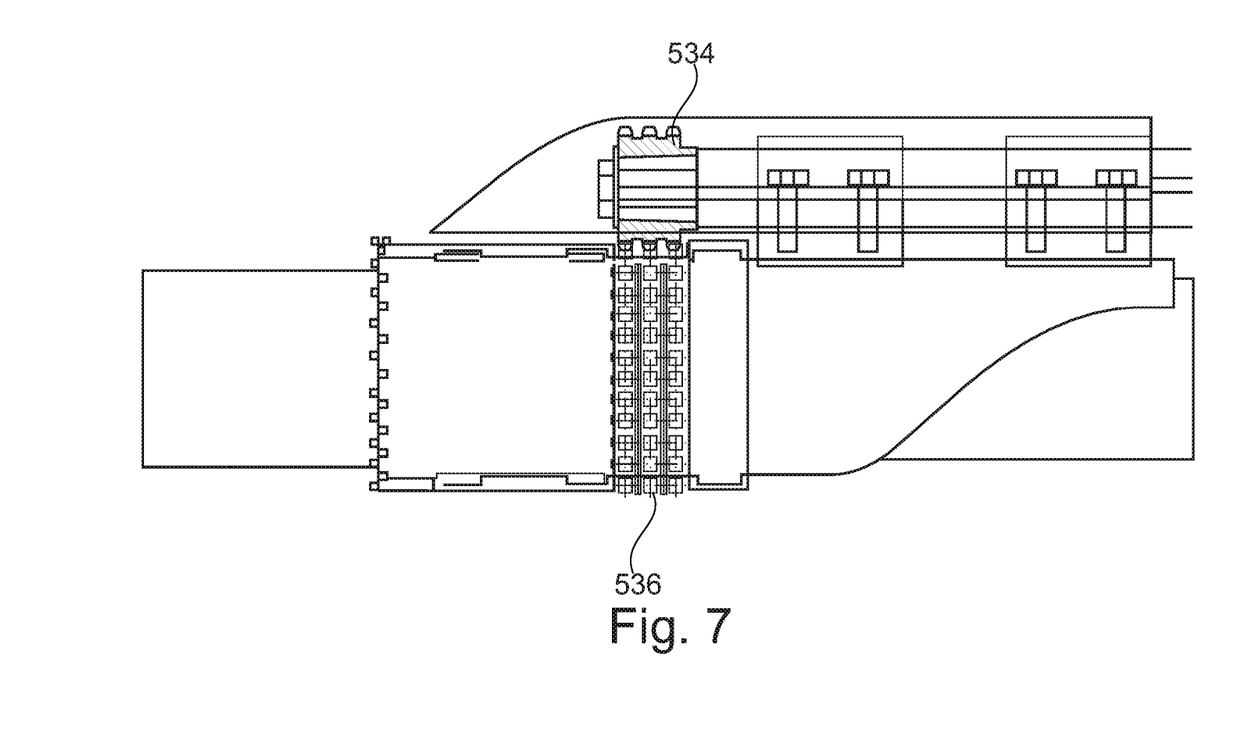
FIG. 7 is a schematic side view of a device according to another embodiment of the invention.

FIG. 7 is a schematic side view of a device according to another embodiment of the invention. The device of FIG. 7 is similar in many ways to the device of FIG. 5 except that in the embodiment of FIG. 7 there are provided a plurality of adjacent perforated tracks 536 instead of the single perforated track 436 shown in FIG. 5. In this embodiment, there are provided first, second and third perforated tracks 536, although other numbers of perforated tracks can be provided in other embodiments. Furthermore, instead of a single sprocket 434 as in FIG. 5, there is provided a plurality of sprockets 534, each sprocket being coupled to a respective perforated track in the manner described in respect of FIG. 5. An advantage of having a plurality of tracks and sprockets in this manner is that greater rotational power can be provided to the displacement element, and the likelihood of the sprocket and track becoming decoupled or a component snapping is reduced.

With regard to the method of removing a cable, it is not necessary to cut the cables if ends of cables can be located. Cables are generally provided in 300m sections. It is preferable to remove sections of 150m, thereby cutting each cable section substantially in two. However, different lengths of cable can be removed if appropriate and/or desired.

Furthermore, although the cable is described as being pulled from the launch site, it is equally possible to pull it from the receive pit.

Additionally, if the cable does not need cutting to form the second end, it is not always necessary to excavate a receive pit.

All optional and preferred features and modifications of the described embodiments are usable in all aspects of the invention taught herein. Furthermore, all optional and preferred features and modifications of the described embodiments are combinable and interchangeable with one another.

The disclosures in British patent application numbers 1408164.0 and 1422808.4, from which this application claims priority, and in the abstract accompanying this application are incorporated herein by reference.

The invention claimed is:

1. A device for use in removing a conveyance member from a material, including:
    a coupling element for coupling the device to a shaft;
    a displacement element for being placed at least partly around a conveyance member and for displacing material as the device is advanced along a conveyance member;
    a driven component for receiving a driving force for driving the device through material; and
    a material loosener operable to loosen material ahead of the displacement element as the device is advanced along a conveyance member;
    wherein the material loosener includes a drilling element coupled to a first wheel and the coupling element includes a second wheel cooperating with the first wheel to transfer rotational movement of a shaft to the drilling element;
    wherein the first wheel includes a perforated track having a chain of roller bearings.

2. A device according to claim 1, wherein the second wheel is a sprocket.

3. A device according to claim 1, wherein the perforated track is provided on or in the displacement element, and the displacement element includes holes or perforations corresponding to and/or aligned with perforations in the perforated track, the holes or perforations of the displacement element passing all the way through the displacement element to allow material to be pushed through the displacement element.

4. A device according to claim 1, wherein the axes of the first and second wheels are substantially parallel.

5. A device according to claim 1, wherein the drilling element is operable to perform continuous and complete rotation.

6. A device according to claim 1, wherein the displacement element is configured for substantially surrounding a conveyance member.

7. A device according to claim 1, wherein the material loosener includes a spray for spraying fluid ahead of the displacement element.

8. A device for use in removing a conveyance member from a material, including:
- a coupling element for coupling the device to a shaft;
- a displacement element for being placed at least partly around a conveyance member and for displacing material as the device is advanced along a conveyance member;
- a driven component for receiving a driving force for driving the device through material; and
- a material loosener operable to loosen material ahead of the displacement element as the device is advanced along a conveyance member, the material loosener including a drilling element coupled to two or more first wheels;
- and wherein the coupling element includes two or more second wheels, each second wheel cooperating with a respective one of the first wheels to transfer rotational movement of a shaft to the drilling element;
- wherein the first wheel includes a chain of roller bearings.

9. The device of claim 8 wherein the chain of roller bearings defines a perforated track.

10. A device for use in removing a conveyance member from a material, the device including:
- a. a material-loosening annular displacement element having:
  - (1) a front end defining a drilling element, the drilling element bearing teeth arrayed about a displacement element central passage,
  - (2) a first wheel coupled to the drilling element, the first wheel having a circumferential perforated track with a series of roller bearings thereon,
- b. a coupling element:
  - (1) configured to couple with a shaft, and
  - (2) having a second wheel cooperating with the first wheel, whereby rotation of the shaft is transmitted to the displacement element to rotate the drilling element thereon,
- whereby:
  - i. driving the shaft forwardly drives the coupling element and displacement element forwardly about a conveyance member situated within the displacement element, and
  - ii. rotating the shaft rotates the displacement member, and thereby rotates the drilling element to loosen material about the conveyance member.

11. The device of claim 10 wherein the second wheel is a sprocket.

12. The device of claim 10 wherein the roller bearings are spaced about the circumference of the first wheel, with the spaces between roller bearings extending into the displacement element central passage, whereby material may be pushed through the spaces.

13. The device of claim 10 wherein the first and second wheels have axes of rotation which are at least substantially parallel.

14. The device of claim 10 wherein the displacement element includes a fluid conduit spray for spraying fluid ahead of the displacement element.

15. The device of claim 10 wherein:
- a. two or more first wheels are coupled to the drilling element, and
- b. the coupling element has two or more second wheels, each second wheel cooperating with one of the first wheels.

16. A system for removing a conveyance member from a material, including:
- a device according to claim 10, and
- a driver including a shaft coupled to the device;
- wherein the driver is operable to provide a rotating force to the shaft.

17. A system according to claim 16, wherein the driver is operable to apply a forward force to the device.

18. A system according to claim 16, wherein the driver is operable to supply a fluid under pressure to the or a spray of the device.

19. A method of removing a conveyance member from a material, the method including:
- placing a device according to claim 10 on the conveyance member at or near a first end thereof;
- advancing the device towards a second end of the conveyance member to loosen material adjacent to the conveyance member between the first and second ends; and
- applying a substantially longitudinal force to the conveyance member to draw the conveyance member out of the material.

20. A method according to claim 19, including rotating a shaft coupled to the device as it is advanced to rotate the drilling element.

* * * * *